April 22, 1958 C. K. HENDERSON 2,831,546
MOTOR VEHICLE SPEED CONTROLLING DEVICE
Filed Dec. 30, 1955 2 Sheets-Sheet 1
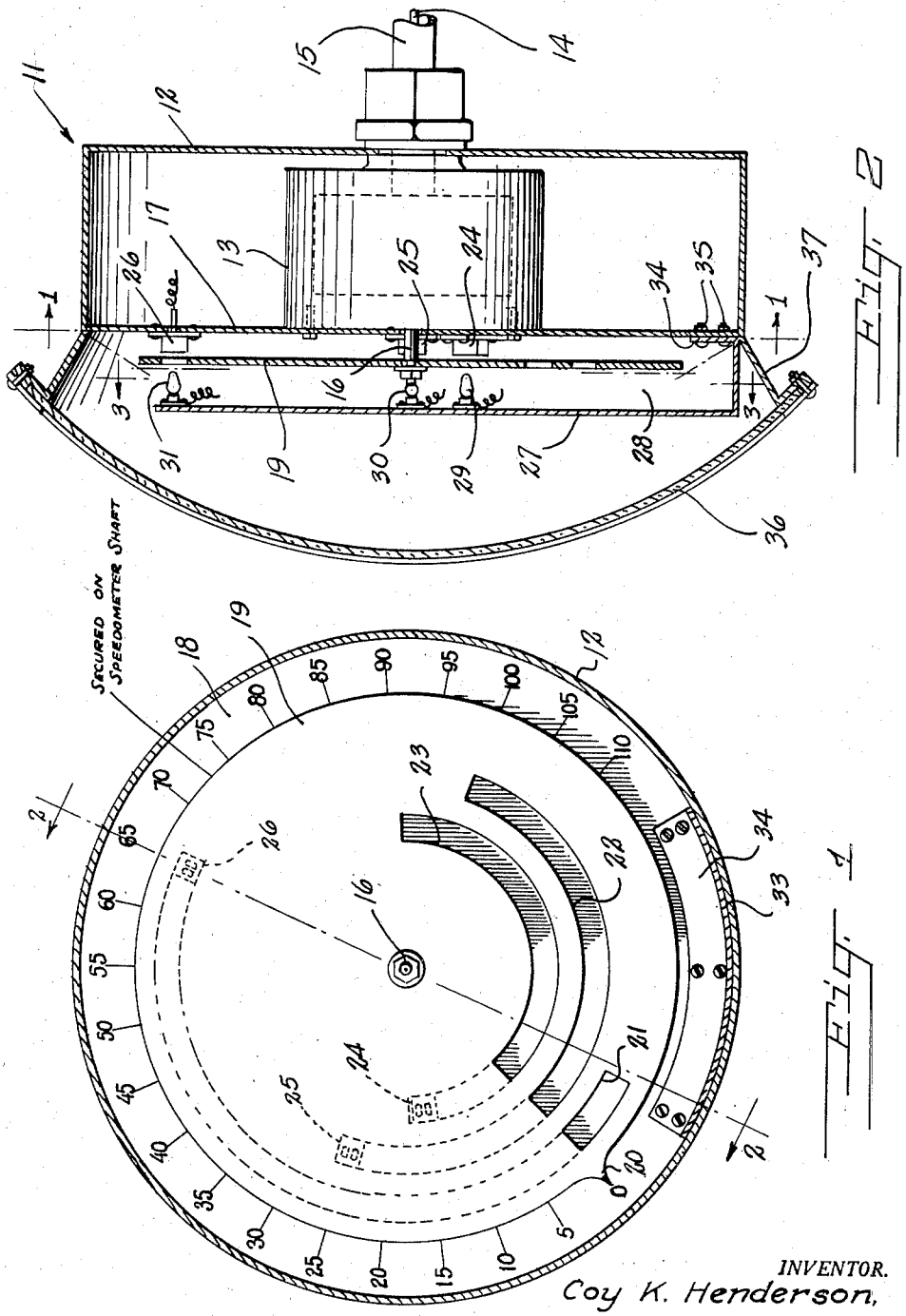
INVENTOR.
Coy K. Henderson,
BY
McMorrow, Berman + Davidson
ATTORNEYS April 22, 1958  C. K. HENDERSON  2,831,546
MOTOR VEHICLE SPEED CONTROLLING DEVICE
Filed Dec. 30, 1955  2 Sheets-Sheet 2
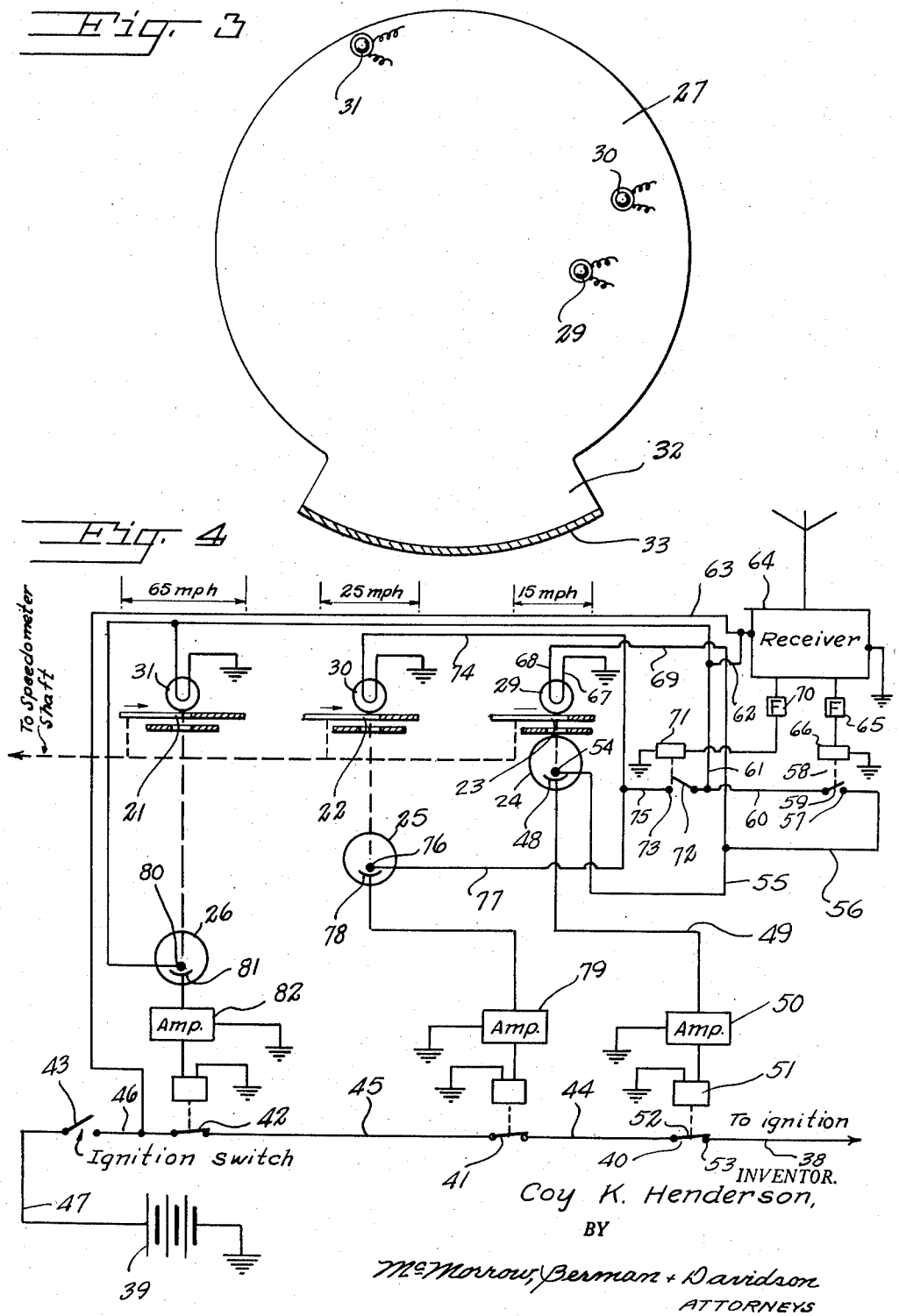
INVENTOR.
Coy K. Henderson,
BY
McMorrow, Berman + Davidson
ATTORNEYS United States Patent Office 2,831,546
Patented Apr. 22, 1958

2,831,546

MOTOR VEHICLE SPEED CONTROLLING DEVICE

Coy K. Henderson, Ore City, Tex.

Application December 30, 1955, Serial No. 556,736

5 Claims. (Cl. 180—82.1)

This invention relates to motor vehicle safety equipment, and more particularly to an improved motor vehicle speed control device.

A main object of the invention is to provide a novel and improved speed control device for a motor vehicle, said device involving relatively simple components, being automatic in operation, and serving to automatically deenergize the ignition circuit of a motor vehicle provided with the device when the vehicle exceeds a predetermined speed.

A further object of the invention is to provide an improved motor vehicle speed control device which involves relatively inexpensive components, which is easy to install, which is reliable in operation, and which is arranged so that it automatically limits the speed of the motor vehicle equipped with the device to a relatively safe maximum speed, as well as providing a means for police or other authorities to impose a lower maximum speed on the motor vehicle, as when the vehicle is traveling through a relatively congested area.

A still further object of the invention is to provide an improved automatic speed control apparatus for a motor vehicle, said apparatus being relatively compact in size, being arranged so that it may be combined with a conventional speedometer, and being further arranged so that it may be controlled at times by an external radio transmitter operated by traffic authorities so as to impose a reduced maximum speed on the motor vehicle, whereby a vehicle cannot travel beyond said maximum speed while passing through the area in which the external transmitter is effective.

Further objects and advantages of the invention will become apparent from the following description and claims, and from the accompanying drawings, wherein:

Figure 1 is a cross sectional view taken transversely through the speedometer of a motor vehicle equipped with the improved speed control apparatus of the present invention, said view being taken on the line 1—1 of Figure 2.

Figure 2 is a cross sectional view taken through the speedometer on the line 2—2 of Figure 1.

Figure 3 is a cross sectional detail view taken on the line 3—3 of Figure 2.

Figure 4 is a schematic wiring diagram showing the electrical circuit of the speed control apparatus constructed in accordance with the present invention.

Referring to the drawings, 11 generally designates a speedometer associated with a motor vehicle, the speedometer comprising the conventional housing 12 in which is mounted the usual speedometer assembly 13 which is driven by the speedometer shaft 14 housed in the speedometer shaft sleeve 15. The driven element of the speedometer comprises a shaft 16 which rotates to angular positions relative in amount to the speed of the vehicle, namely, in accordance with the speed of rotation of the driving shaft element 14. In the ordinary speedometers, a needle or similar pointer element is mounted on the driven shaft 16, said pointer element being rotated to indicate the speed of the vehicle, as reflected by the speed of the driving shaft element 14. The front wall of the housing 12, shown at 17, is thus provided with a vehicle speed scale 18 which is inscribed on the front surface of wall 17 around the pjeriphery thereof, as shown in Figure 1.

Secured on the shaft 16 is a disc member 19 which may be employed as a speed indicator by providing a suitable index mark at the margin of said disc member, to indicate the vehicle speed with reference to the scale 18. Thus, in Figure 1, a pointer element 20 may be provided on the marginal portion of the disc member 19 which indicates the vehicle speed with reference to the scale 18.

The disc member 19 is formed with respective arcuate slots 21, 22 and 23 arranged concentrically with the shaft 16 and located at respective different radial distances from said shaft, as is clearly apparent from Figure 1. Mounted on the front wall 17 of the speedometer 11 at respective radial distances from shaft 16 corresponding to the radial distances of the slots 21, 22 and 23, are respective photo-electric cells 24, 25 and 26, said photo-electric cells being spaced angularly with respect to each other, as shown in Figure 1, for a purpose presently to be explained.

Designated at 27 is a bracket plate which is secured to the front wall 17 of the speedometer housing 12 and which is positioned forwardly of said wall 17 in parallel spaced relationship thereto, as shown in Figure 2, defining a space 28 in which the disc member 19 is housed. Mounted on the bracket plate 27 opposite the respective photo-electric cells 24, 25 and 26 are respective electric lamps 29, 30 and 31 which are normally shielded from the photo-electric cells by the disc member 19, but which illuminate said cells when the slots 21, 22 or 23 come into registry therewith.

As shown in Figure 3, the bracket plate 27 may be generally circular in shape, but of smaller diameter than the disc member 19, whereby the pointer element 20 on the periphery of disc member 19 is clearly visible at all times, and whereby the movement of said pointer element 20 with respect to the vehicle speed scale 18 may be easily observed. The bracket plate 27 is formed with the depending lower portion 32 having the arcuate flange 33, said flange being formed at its end with the upturned portion 34 which is fastened to the lower portion of the peripheral margin or wall 17 in any suitable manner, as by a plurality of fastening bolts 35.

The speedometer 11 is provided with the transparent outwardly convex bezel 36 which is secured on an annular mounting flange 37 provided on housing 12, as shown in Figure 2.

Referring now to Figure 4, the motor vehicle on which the speedometer 11 is installed is provided with an ignition circuit, connected to the ignition wire 38, said wire 38 being connected to the ungrounded terminal of the vehicle battery 39 through a series of switches, comprising a first relay switch 40, a second relay switch 41, a third relay switch 42, and a conventional ignition switch 43. Thus, wire 38 is connected to the ungrounded terminal of battery 39 by switch 40, a wire 44, switch 41, a wire 45, switch 42, a wire 46, switch 43, and a wire 47, as shown in Figure 4.

The relay switch 40 is controllingly connected to the photo-electric cell 24, the anode 48 of said cell being connected by a wire 49 to the input grid of a conventional amplifier 50, the output circuit of said amplifier including a relay winding 51 which operates a switch pole 52 engageable with a stationary contact 53 to which wire 38 is connected, as shown in Figure 4. Normally, when the winding 51 is deenergized, the pole 52 engages the contact 53. The cathode 54 of the photo-electric cell is connected by a wire 55 to a wire 56. Wire 56 is connected to the stationary contact 57 of a relay switch 58. The pole 59 of switch 58 is connected by a wire 60 to a wire 61. A wire 62 connects wire 61 to a wire 63, which is connected to the wire 46, and which is thus connected through the ignition switch 43 to the ungrounded terminal of the automobile battery 39. Wire 63 is connected to the power supply terminal of a radio receiver 64 mounted in the vehicle and being tuned to a predetermined radio frequency designated for use by police or traffic authorities authorized to control the speed of the vehicle in the areas over which such authorities have jurisdiction.

Radio receiver 64 includes in its output circuit a first filter 65, the output circuit of which is connected to the winding of the relay switch 58, shown at 66, the filter 65 being resonant to a predetermined modulation frequency, whereby the pole 59, normally disengaged from contact 57, will respond to the energization of the relay winding 66 to cause pole 59 to engage contact 57 when the signal to which receiver 64 is tuned is modulated by the frequency to which the filter circuit 65 is resonant.

As shown in Figure 4, lamp 29 has one grounded terminal 67 and a terminal 68 connected by a wire 69 to the wire 56. Thus, when relay switch 58 closes, responsive to the reception of a signal by radio receiver 64 modulated by the frequency to which filter circuit 65 is tuned, the lamp 29 is energized by a circuit comprising the ungrounded terminal of battery 39, wire 47, ignition switch 43, wire 46, wire 63, wire 62, wire 61, wire 60, switch pole 59, contact 57, wire 56, wire 69, the lamp filament, and the ground wire 67. Receiver 64 is, of course, energized by the closure of the ignition switch 43. The cathode 54 of the photo-electric cell 24 is connected to the wire 56 by wire 55, and is thus connected to the ungrounded terminal of battery 39 by the same circuit above described which energizes the lamp 29. Under these conditions, if the vehicle speed should exceed a predetermined value, for example, 15 miles per hour, the slot 23 will move into registry with the lamp 29 and the photoelectric cell 24, causing the cell 24 to conduct because of the light projected thereupon by lamp 29 through slot 23, whereby the winding 51 of the relay switch 40 will become energized and the switch pole 52 will be moved away from the contact 53, thus opening the ignition circuit.

It will be understood that the amplifier 50 may be of any conventional type responsive to the flow of current through the wire 49, and arranged to provide energization of the winding 51 in response to such flow of current. Thus, the amplifier 50 may comprise a triggering circuit to control a grid glow tube or similar tube of the "Thyratron" type, to provide energization of the winding 51 responsive to conduction of the photocell 24.

The photocell 25 is controllingly connected in a similar manner to the relay switch 41 to energize switch 41 when the receiver 64 receives a signal containing a modulation frequency to which a second filter circuit 70, connected to the output circuit of the receiver, is resonant. As shown in Figure 4, a relay switch 71 is connected to the output circuit of the filter 70, said switch 71 controlling a switch pole 72 which engages a stationary contact 73 when the relay switch 71 is energized. The ungrounded terminal of the lamp 30 is connected by a wire 74 to a wire 75 which is in turn connected to contact 73. The switch pole 72 is connected to the wire 60, as shown. The cathode 76 of photocell 25 is connected to wire 75 by a wire 77. The anode 78 of photocell 25 is connected to the input grid of a conventional amplifier 79 in whose output circuit is connected the winding of the relay switch 41, whereby said winding is energized responsive to conduction of the photocell 25 in the same manner as previously described in connection with the photocell 24. The photocell 25 conducts when the slot 22 moves into registration with lamp 30 and photocell 25, the lamp 30 being energized by the closure of the switch pole 72, as above described, and the cathode 76 of photocell 25 being connected in parallel with the ungrounded terminal of lamp 30 to the ungrounded terminal of the vehicle battery. Thus, the photocell 25 may be located so that slot 22 moves into registry with photocell 25 and lamp 30 when the vehicle speed reaches a predetermined value, for example, 25 miles per hour, at which speed the modulation applied by the controlling transmitter and resonating the filter circuit 70 is effective to open the ignition circuit at the pole of the relay switch 41.

The ungrounded terminal of the lamp 31 is connected directly to the wire 61, as is the cathode 80 of the photocell 26. Thus, lamp 31 becomes energized by the closure of the ignition switch 43, in parallel with the radio receiver 64. The cathode 80 is at the same time connected to the ungrounded terminal of battery 39. The anode 81 of photocell 26 is connected to the input grid of a conventional amplifier 82, the winding of the relay switch 42 being connected in the output circuit of amplifier 82, as shown in Figure 4. Thus, the relay switch 42 is not subject to control by the radio receiver 64, but is operated only when the arcuate slot 21 comes into registry with lamp 31 and photocell 26, namely, when the vehicle speed reaches a predetermined maximum value, for example, 65 miles per hour. When this occurs, the photocell 26 is illuminated by the lamp 31 through the slot 21, energizing the winding of the relay switch 42, and opening the ignition circuit at the pole of said relay switch.

From the above description, it will be readily apparent that the maximum speed of the motor vehicle is automatically controlled by the action of the speedometer disc 19, to cause deenergization of the ignition circuit of the vehicle automatically when the vehicle speed reaches a predetermined maximum value, such as 65 miles per hour. The opening of the ignition circuit will cause the vehicle to slow down and decrease its speed, until the value of the vehicle speed is insufficient to maintain the slot 21 in registry with lamp 31 and photocell 26. This will deenergize the relay switch 42, again closing the ignition circuit, and allowing the vehicle to resume normal operation. In the same manner, when the vehicle passes through a controlled area, wherein a transmitter is operating which provides a radio signal to which the receiver 64 is tuned, and containing modulation to which either filter 65 or filter 70 is resonant, the speed of the vehicle will be controlled to be maintained below that associated with slot 22 or 23, depending upon which modulation frequency is employed by the traffic authorities.

For example, when the vehicle is passing through a highly congested area, such as a school area, the traffic authorities may employ a modulation frequency to which the filter circuit 65 is resonant, whereby the speed of the vehicle is held below 15 miles per hour, corresponding to the location of the slot 23 on the speedometer disc 19. In a somewhat less congested area, the traffic authorities may employ a modulation frequency to which the filter circuit 70 is resonant, whereby the maximum speed of the vehicle will be held to a value, such as 25 miles per hour, corresponding to the location of the slot 22 on the speedometer disc 19.

Obviously, a plurality of additional slots and associated photoelectric cell circuits may be employed, and the radio receiver may be provided with associated filter circuits and relay switches controlled thereby, within the spirit of the present invention.

While a specific embodiment of an improved motor vehicle speed control apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having an ignition circuit and a speedometer of the type having a shaft which rotates to angular positions relative in amount to the speed of the vehicle, a normally closed switch in said ignition circuit, a photocell mounted in said speedometer, a normally deenergized light source mounted in the speedometer opposite said photocell, a masking member mounted on said shaft between the photocell and the light source and having an aperture registrable with said photocell and light source when the speedometer shaft rotates to a position corresponding to a predetermined vehicle speed, a radio receiver, means formed and arranged to energize said light source responsive to reception of a signal by said receiver, and means controlled by said photocell formed and arranged to open said switch responsive to reception of light from said light source by said photocell.

2. In a motor vehicle having an ignition circuit and a speedometer of the type having a shaft which rotates to angular positions relative in amount to the speed of the vehicle, normally deenergized relay means having a pair of normally closed contacts opening responsive to energization of the relay means, means connecting said contacts in said ignition circuit, a photocell mounted in said speedometer, a light source mounted in the speedometer opposite said photocell, a masking member mounted on said shaft between the photocell and the light source and having an aperture registrable with said photocell and light source when the speedometer shaft rotates to a position corresponding to a predetermined vehicle speed, a radio receiver, a source of current, and means formed and arranged to connect said relay means to said source of current through said photocell responsive to reception of a signal by said receiver, whereby to energize said relay means and open said contacts at said predetermined vehicle speed.

3. In a motor vehicle having an ignition circuit and a speedometer of the type having a shaft which rotates to angular positions relative in amount to the speed of the vehicle, a normally closed switch in said ignition circuit, a photocell mounted in said speedometer, a normally deenergized light source mounted in the speedometer opposite said photocell, a masking member mounted on said shaft between the photocell and the light source and having an aperture registrable with said photocell and light source when the speedometer shaft rotates to a position corresponding to a predetermined vehicle speed, a source of current, a radio receiver, means formed and arranged to connect said light source and said photocell to said source of current responsive to the reception of a signal by said radio receiver, and means formed and arranged to open said switch responsive to reception of light from said light source by said photocell.

4. In a motor vehicle having an ignition circuit, speed-responsive means comprising a shaft which rotates to a predetermined angular position in accordance with the speed of the vehicle, normally deenergized relay means having a pair of normally closed contacts opening responsive to energization of the relay means, means connecting said contacts in said ignition circuit, a photcell mounted adjacent said speed-responsive device, a light source mounted adjacent said speed-responsive device opposite said photocell, a masking member mounted on said shaft and formed to expose said photocell to said light source when said shaft rotates to a predetermined position, a radio receiver, a source of current, and means formed and arranged to connect said relay means to said source of current through said photocell responsive to reception of a signal by said receiver.

5. In a motor vehicle having an ignition circuit, a speed-responsive device having a shaft which rotates to different angular positions in accordance with the speed of the vehicle, normally deenergized relay means having a pair of normally closed contacts opening responsive to energization of the relay means, means connecting said contacts in said ignition circuit, a photocell mounted adjacent said speed-responsive device, a normally deenergized light source mounted adjacent said speed-responsive device opposite said photocell, a masking member mounted on said shaft between the photcell and the light source and being formed and arranged to expose said photocell to said light source when said shaft rotates to a predetermined angular position, a source of current, a radio receiver, means formed and arranged to connect said light source to said source of current responsive to thhe reception of a signal by said receiver and means energizing said relay means responsive to the reception of light from said light source by said photocell, whereby to open said contacts.

References Cited in the file of this patent

UNITED STATES PATENTS

| Re. 21,818 | Halsted | June 3, 1941 |
| 977,703 | Brown | Dec. 6, 1910 |
| 2,164,114 | Kolb | June 27, 1939 |
| 2,263,228 | Wolff et al. | Nov. 18, 1941 |
| 2,265,149 | Crane et al. | Dec. 9, 1941 |
| 2,656,002 | Keeton et al. | Oct. 20, 1953 |
| 2,780,300 | Beyer | Feb. 5, 1957 |